(12) United States Patent
Watanabe

(10) Patent No.: US 7,944,686 B2
(45) Date of Patent: May 17, 2011

(54) DISK DEVICE

(75) Inventor: Takashi Watanabe, Ichikawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 114 days.

(21) Appl. No.: 12/548,376

(22) Filed: Aug. 26, 2009

(65) Prior Publication Data

US 2010/0053881 A1  Mar. 4, 2010

(30) Foreign Application Priority Data

Aug. 29, 2008  (JP) .................................. 2008-221003

(51) Int. Cl.
*G06F 1/16* (2006.01)

(52) U.S. Cl. ................. 361/679.33; 455/550.1; 174/255; 439/638; 40/621

(58) Field of Classification Search ............... 40/124.09, 40/1.5, 1.6, 621; 361/679.32, 679.33, 679.34, 361/679.37, 679.4, 679.41, 679.01, 679.21; 720/623; 434/365; 439/589, 579, 668, 583, 439/63, 578, 638, 620.03; 455/557, 550.1, 455/575.1, 82, 562.1; 174/84 R, 88 C, 535, 174/66, 67, 255

See application file for complete search history.

(56) References Cited

U.S. PATENT DOCUMENTS

| 4,363,056 | A |   | 12/1982 | Riggle et al. |
| 5,695,346 | A | * | 12/1997 | Sekiguchi et al. ............. 434/365 |
| 5,911,522 | A | * | 6/1999 | Wood .......................... 40/124.09 |
| 6,948,176 | B2 |   | 9/2005 | Cho et al. |
| 2007/0277187 | A1 | * | 11/2007 | Fujisawa ........................ 720/623 |
| 2009/0195976 | A1 | * | 8/2009 | Chang ....................... 361/679.34 |

FOREIGN PATENT DOCUMENTS

| CN | 1202529 C | 5/2005 |
| JP | 2007-265470 A | 10/2007 |

OTHER PUBLICATIONS

Office Action dated Oct. 11, 2010, for corresponding Chinese Application No. 200910170606.9, 4 pages.

* cited by examiner

*Primary Examiner* — Hung V Duong

(74) *Attorney, Agent, or Firm* — Seed IP Law Group PLLC

(57) ABSTRACT

In a disk device, a case includes a base frame and a top panel, which are made of thin metal plates. In the top panel, a corrugated section is formed to increase its rigidity. The corrugated section has peaks and valleys that are alternately arranged. The peaks and valleys extend in a direction orthogonal to a disk loading direction to the vicinity of both side ends of the top panel.

4 Claims, 5 Drawing Sheets

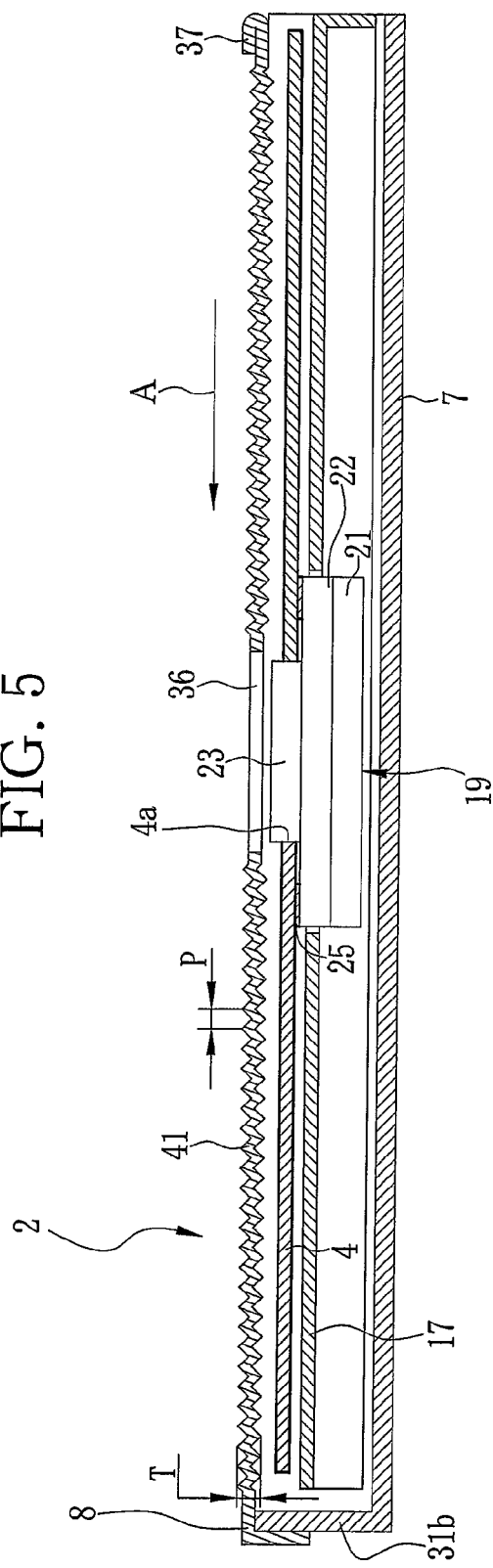
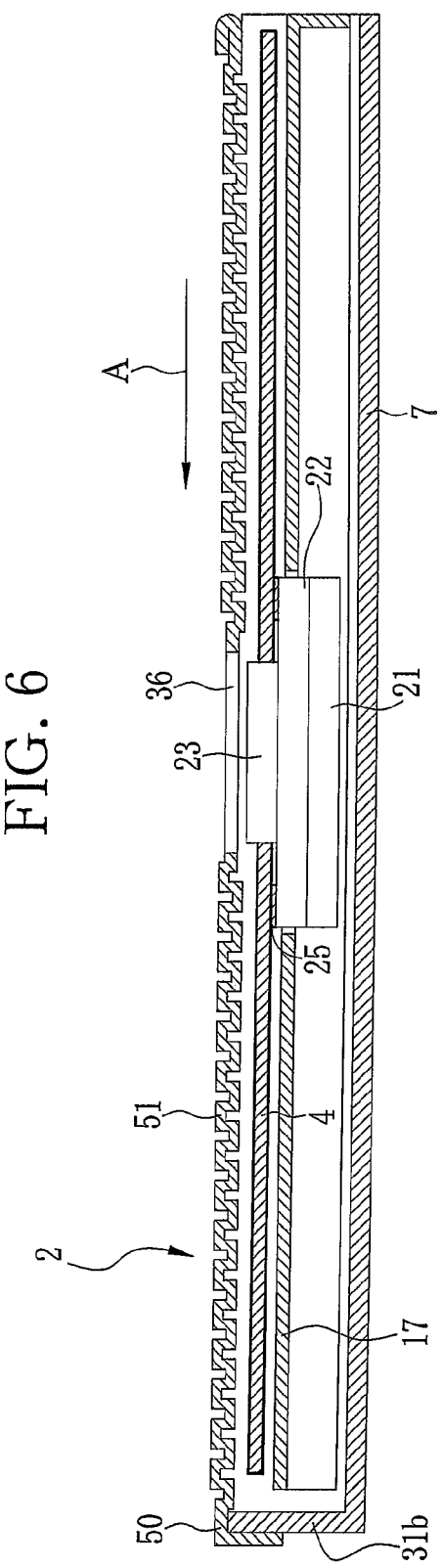

DISK DEVICE

BACKGROUND OF THE INVENTION

1. Field of the Invention

The present invention relates to a disk device used in electronic equipment or the like.

2. Description Related to the Prior Art

A disk device or disk drive writes data on a disk such as CD, DVD and Blu-ray Disc, and/or reads and reproduces data from the disk by shifting a pickup head while rotating the disk that has been loaded on a turntable. The disk device is internally or externally installed in electronic equipment e.g. a personal computer.

There are two types of disk devices, including a slot-in type having an insertion slot at its front face for loading and unloading the disk, and a tray type having a disk tray for placement of the disk. The disk device of the slot-in type has a writing/reading unit in its case, and the disk is inserted from the insertion slot into the case. In the disk device of the tray type, on the other hand, the writing/reading unit is incorporated into the disk tray. The disk tray is movable between a closed position to be contained in the case and an open position to be ejected therefrom. The disk is placed on the disk tray in the open position, and then the disk tray is shifted to the closed position. In any type of the disk devices, the case is constituted of a base frame for containing the writing/reading unit and a top panel fitted on the base frame.

When the disk device is incorporated into a portable personal computer (called notebook PC), the disk device is required to have light weight for reduction in the total weight of the notebook PC. In addition, the externally connected disk device is especially required to be lighter in weight to improve its portability. For the sake of reducing the weight of the disk device, it is conceivable to thin the top panel.

In rotating the disk, negative pressure occurring between the disk and the top panel pulls the top panel down toward the disk. Thinning the top panel degrades its rigidity, so that there was a problem that the top panel was bent by the negative pressure, and made contact with the disk. Japanese Patent Laid-Open Publication No. 2007-265470 discloses a disk device in which a circular corrugated section is formed in the top panel concentrically about a rotation axis of the disk in order to reduce its weight without degradation in rigidity.

The above disk device can prevent bending of the top panel due to the negative pressure that occurs during rotation of the disk. The top panel, however, has low rigidity against pressing force from above, and hence may be bent by an external press. In the notebook PC, for example, a keyboard is disposed over the disk device. Operation on the keyboard applies pressing force to the top panel, and causes the top panel to bend and contact with the disk. In the internally incorporated disk device, a metal leaf spring is pressed against the top panel to establish a ground. The biasing force of the leaf spring may also cause the top panel to bend and contact with the disk.

SUMMARY OF THE INVENTION

An object of the present invention is to provide a disk device that offers weight reduction without degradation in rigidity.

In order to achieve the above and other objects, a disk device includes a writing/reading unit, a base frame, a top panel and a corrugated section. The writing/reading unit reads data from a loaded disk and/or writes data on the disk. The base frame contains the writing/reading unit. The top panel is secured to the base frame at an end thereof, for covering the base frame. The corrugated section is formed in the top panel. The corrugated section includes a plurality of peaks and a plurality of valleys alternately arranged. The peaks and valleys extend in a direction orthogonal to a disk loading direction.

It is preferable that the corrugated section be formed by press working.

It is preferable that the peaks and valleys extend to the vicinity of the end.

The writing/reading unit may have a chuck head for holding the disk. The top panel may have a receiving opening for preventing contact of the chuck head with the top panel. In this case, the corrugated section may be formed at least in an area from a front end of the top panel to the receiving opening.

According to the present invention, the top panel has the corrugated section consisting of the peaks and valleys that extend in the direction orthogonal to the disk loading direction. Thus, if the top panel is thinned and lightened, it is possible to keep rigidity of the top panel against pressing force from above at almost the same level as conventional one. Therefore, it is possible to reduce the weight of the disk device without degradation in rigidity of the top panel.

BRIEF DESCRIPTION OF THE DRAWINGS

The above objects and advantages of the present invention will become easily understood by one of ordinary skill in the art when the following detailed description would be read in connection with the accompanying drawings.

FIG. 5 is a sectional view of the disk device according to a first embodiment; and FIG. 6 is a sectional view of a disk device according to a second embodiment.

PREFERRED EMBODIMENTS OF THE INVENTION

Figure 1:
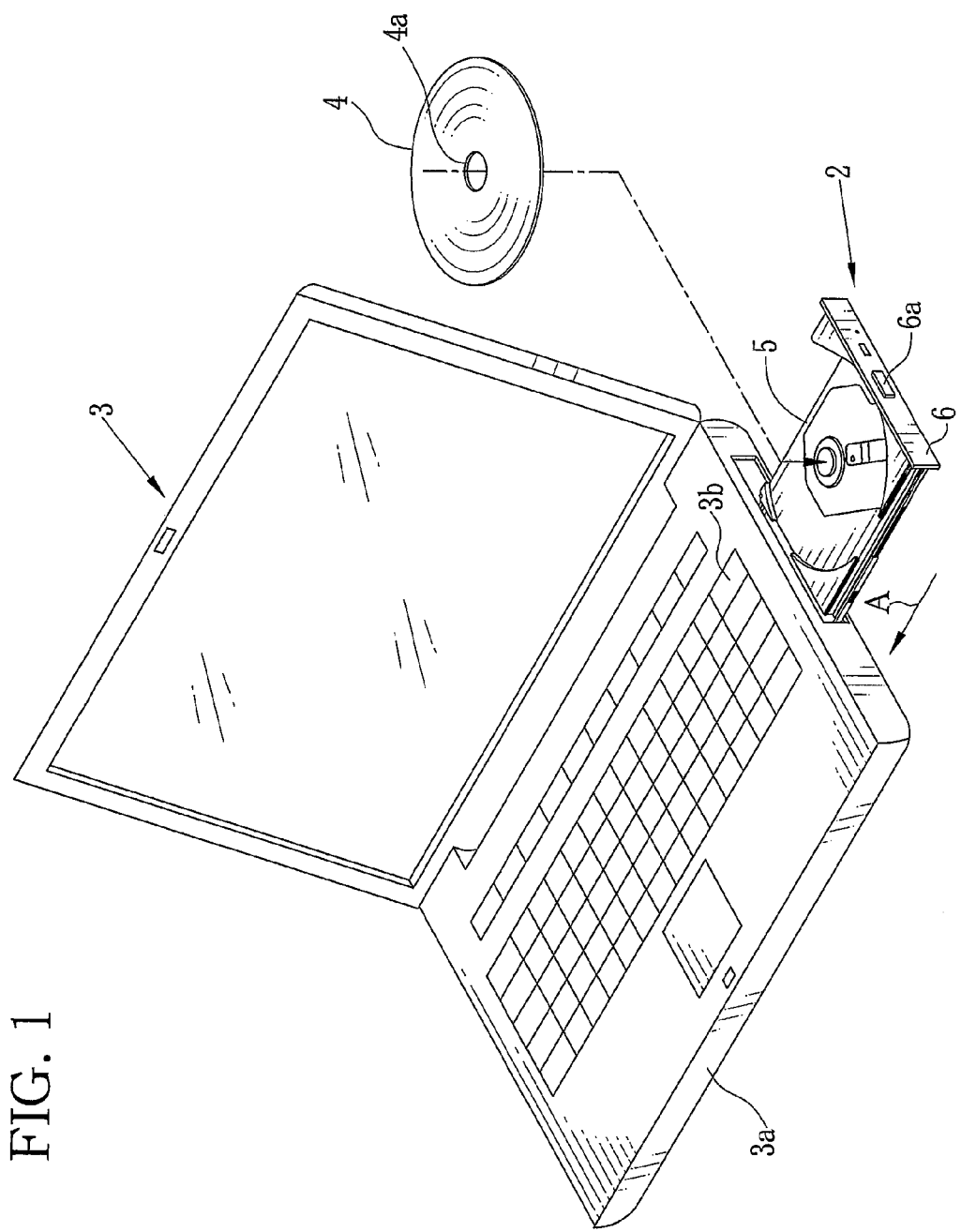
FIG. 1 is an external view of a notebook PC into which an disk device according to the present invention is incorporated.
Figure 3:
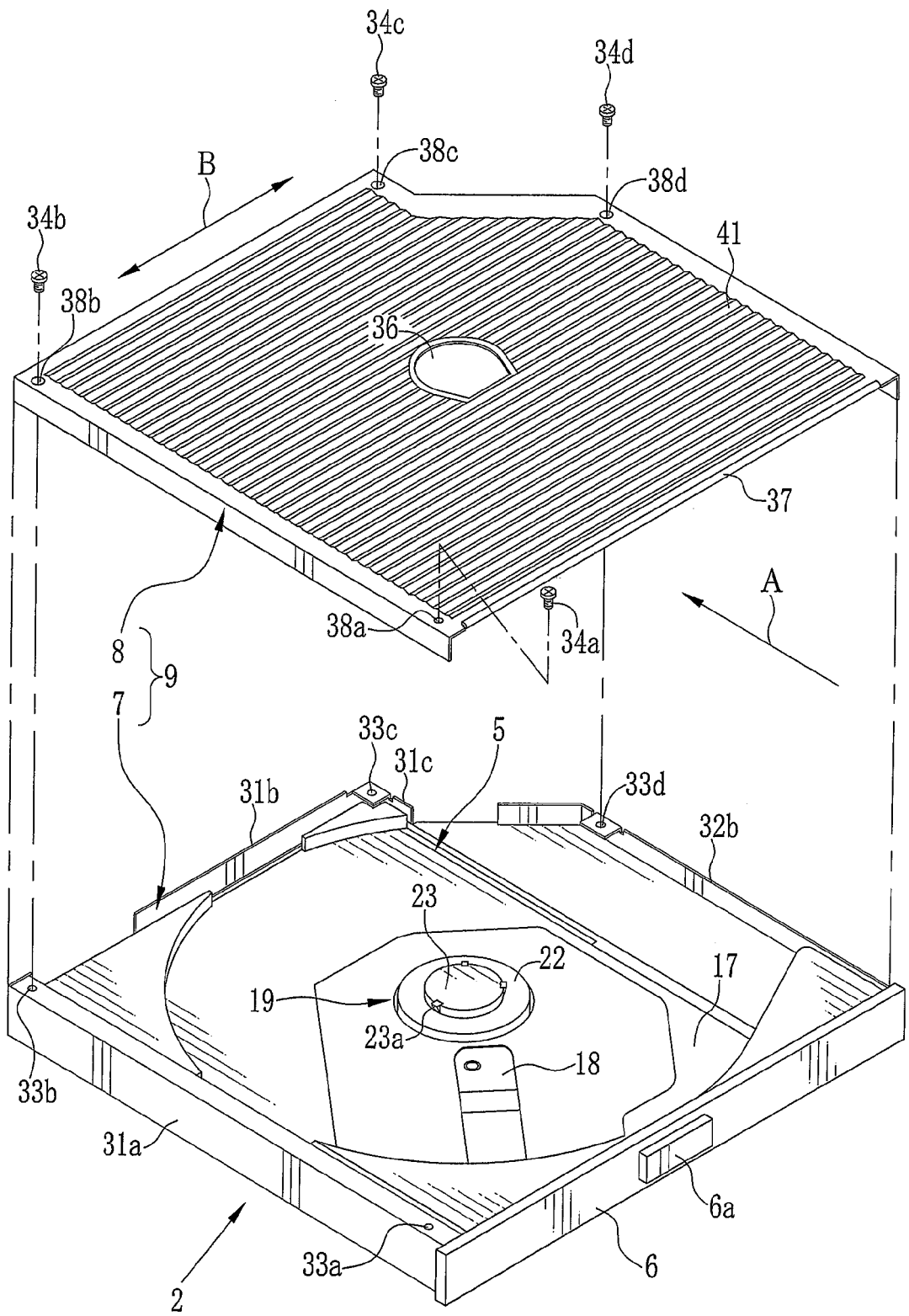
FIG. 3 is a perspective view of the disk device with the top panel detached in which the tray unit is in a closed position.
Figure 4:
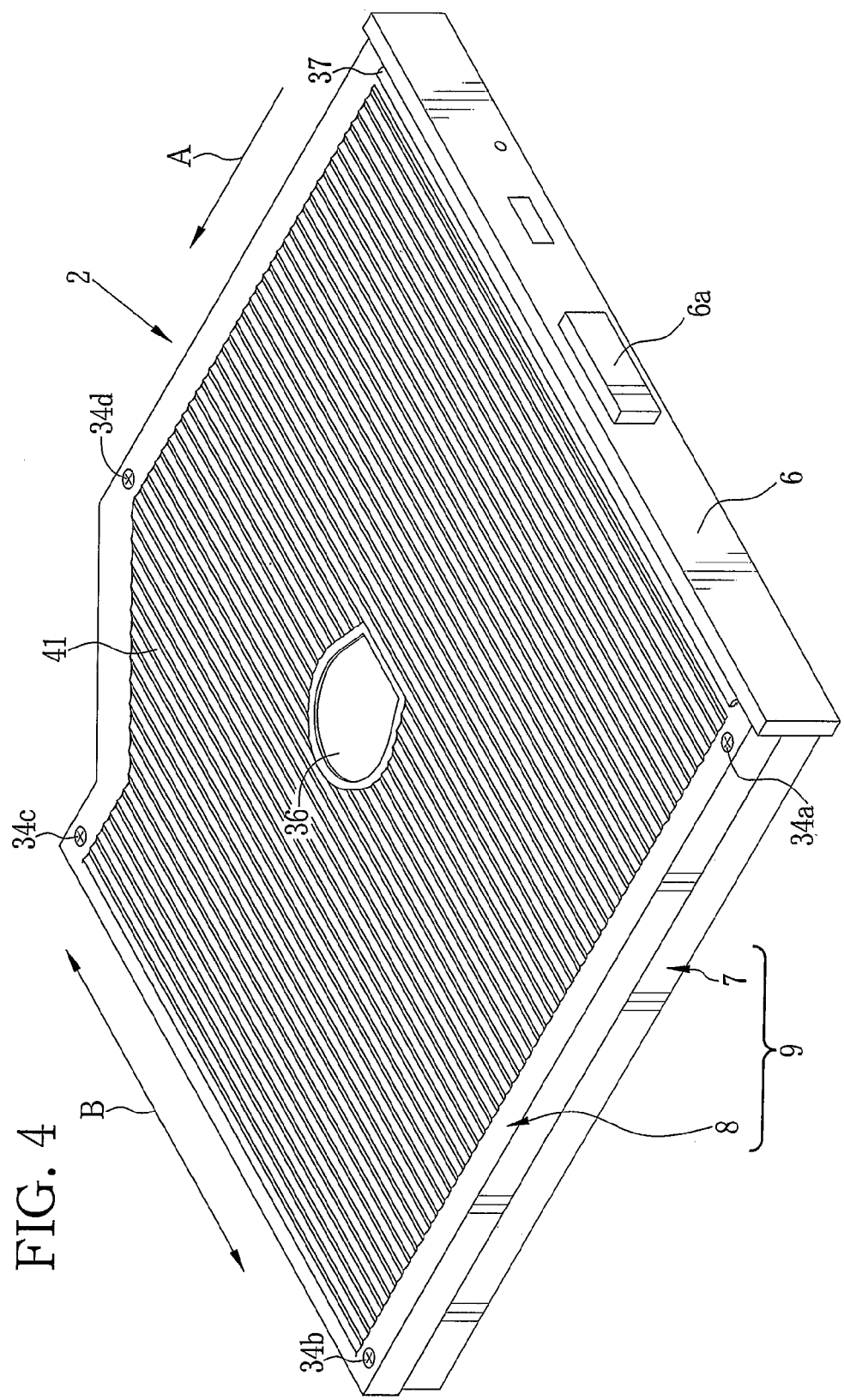
FIG. 4 is a perspective view of the disk device in which the tray unit is in the closed position.

As shown in FIG. 1, a disk device or disk drive 2 is incorporated into a computer body 3a of a notebook PC 3. On the disk device 2, a keyboard 3b is provided. The disk device 2 is provided with a tray unit 5 for placement of a disk 4, a front cover 6 having an eject button 6a, and a case 9 (see FIG. 3) for containing the tray unit 5. The case 9 is constituted of a base frame 7 and a top panel 8 (see FIG. 3) both of which are made of a thin metal plate.

Figure 2:
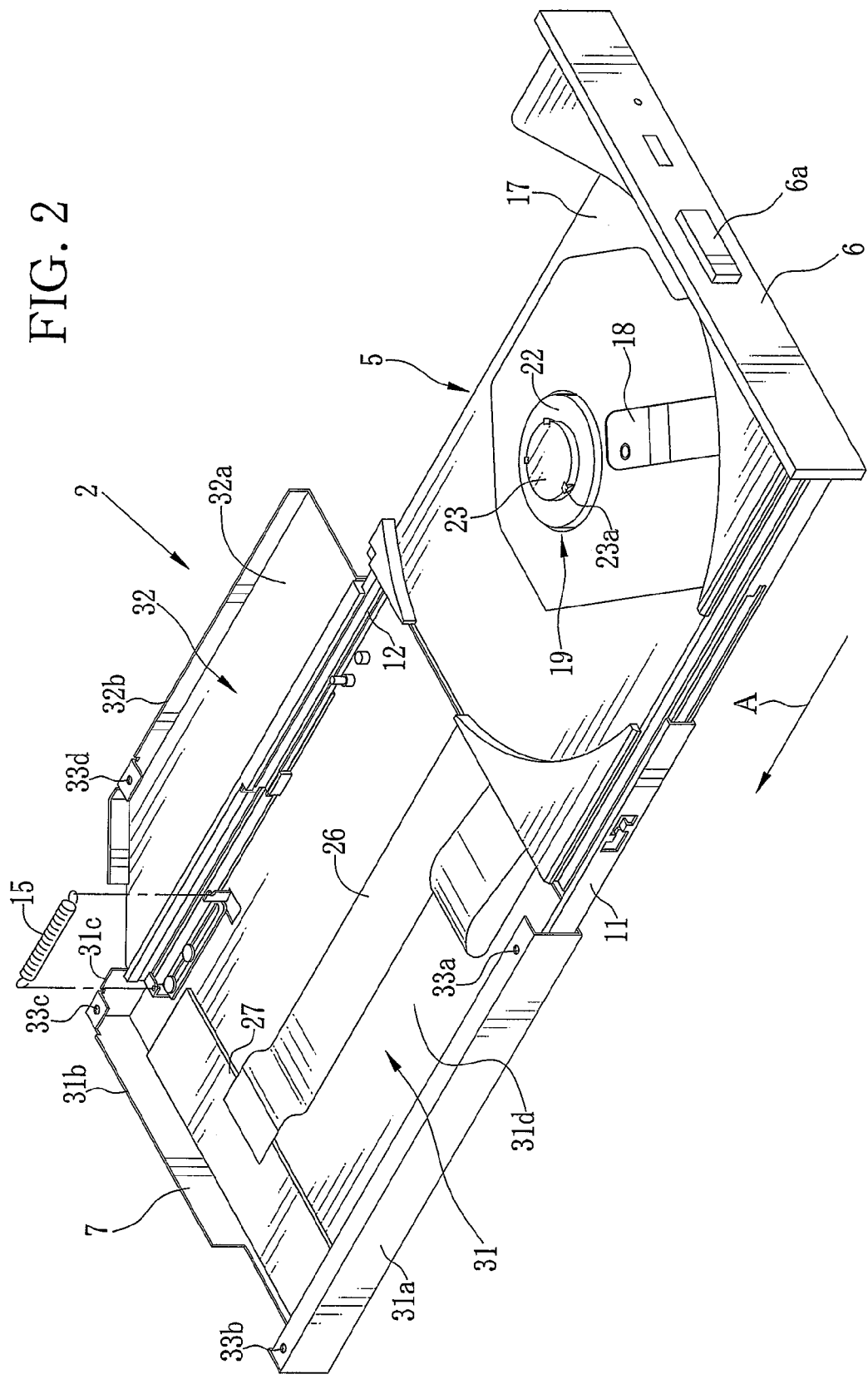
FIG. 2 is a perspective view of the disk device without a top panel in which a tray unit is ejected.

As shown in FIG. 2, slide rails 11 and 12 are slidably attached on both side walls of the base frame 7. The slide rails 11 and 12 slidably support the tray unit 5, so that the tray unit 5 is movable between a closed position (shown in FIG. 3) to be contained in the case 9 and an open position (shown in FIG. 2) to be ejected therefrom. When the tray unit 5 is shifted from the open position to the closed position, the disk 4 on the tray unit 5 is moved to a disk loading direction A, and set in a loaded position.

The base frame 7 is provided with an eject spring 15. When the tray unit 5 reaches the closed position, a hook (not shown) is engaged with the tray unit 5 while the eject spring 15 is charged. Accordingly, the tray unit 5 is mechanically locked at the closed position.

The tray unit 5 includes a disk tray 17 on which the disk 4 is placed, a pickup head 18, and a disk driver or rotation mechanism 19 for holding and rotating the disk 4. The pickup head 18 is movable in a radial direction of the disk 4. The pickup head 18 writes data on or reads data from the disk 4 that is rotated by the disk driver 19. The pickup head 18 and the disk driver 19 compose a writing/reading unit in this embodiment.

As shown in FIG. 5, the disk driver 19 includes a spindle motor 21 for rotating the disk 4 and a turntable 22 secured to a drive shaft of the spindle motor 21. The turntable 22 is integral with a chuck head 23. When the disk 4 is put on and pressed against the disk tray 17, the chuck head 23 fits into a chuck hole 4a to hold the disk 4. The chuck head 23 has a plurality of chuck claws 23a, which are biased by springs. The chuck claws 23a detachably catch the disk 4. A ring-shaped non-slip sheet 25 adheres on the top of the turntable 22 for preventing a slip of the disk 4.

The disk tray 17 has a drive circuit board (not illustrated) for driving the pickup head 18 and the spindle motor 21. The drive circuit board is connected to a main circuit board 27 through a flexible circuit board 26.

Next, the case 9 will be described with referring to FIGS. 2 to 5. The case 9, as described above, is constituted of the base frame 7 for shiftably containing the disk 4 and the tray unit 5, and the top panel 8 for covering the top of the base frame 7. The base frame 7 and the top panel 8 are manufactured by subjecting thin metal plates containing iron, aluminum or the like to sheet-metal working. In this embodiment, the base frame 7 is made of an aluminum plate with a thickness of 0.5 mm. The top panel 8 is made of an aluminum plate with a thickness of 0.25 mm.

The base frame 7 includes a tray unit container or receiving chamber 31 and a disk container or side chamber 32 adjoining to each other. To save space in the computer body 3a, the height of the disk container 32 is lower than that of the tray unit container 31.

The tray unit container 31 has a left wall 31a, a back wall 31b and a right wall 31c that surround a rectangular bottom 31d. The tray unit container 31 opens at its front end to enable loading and unloading of the tray unit 5. A direction that the tray unit 5 is pulled from the closed position to the open position is referred to as a front side, and the opposite direction is referred to as a back side. The left wall 31a is perpendicularly bent at its upper end, and shaped like an inverted letter "L" in cross section to support the top panel 8 thereon. The right wall 31c has a higher portion provided in the back side, and a lower portion provided in the front side. The lower portion of the right wall 31c continues to a bottom 32a of the disk container 32. A part of the higher portion of the right wall 31c positioned at the corner with the back wall 31b is perpendicularly bent at its upper end to support the top panel 8 thereon. Inside the tray unit container 31, there are provided not-illustrated partitions and the like. Since the partitions function as stiffening ribs, the base frame 7 has high rigidity.

The disk container 32 includes the bottom 32a, and a side wall 32b perpendicularly erect from the bottom 32a. The side wall 32b is cut out entirely at the front side of the disk container 32 and partly at the back side thereof. A part of the side wall 32b is bent at its upper end to support the top panel 8 thereon.

Screw holes 33a and 33b are formed in the bent portion of the left wall 31a of the tray unit container 31. A screw hole 33c is formed in the bent portion of the right wall 31c, and a screw hole 33d is formed in the bent portion of the disk container 32. Four screws 34a to 34d are tight in the screw holes 33a to 33d, respectively. The top panel 8 is disposed on the bent portions, and fastened thereto by four screws 34a to 34d through the screw holes 33a to 33d.

The top panel 8 has such a shape as to cover the tray unit container 31 and the disk container 32 of the base frame 7. There is formed a receiving opening 36 at approximately the center of the top panel 8. The opening 36 prevents contact of the chuck head 23 to the top panel 8 if the chuck head 23 slightly levitates during rotation of the disk 4.

Ends of the top panel 8 are bent downward except its front side. Accordingly, when the top panel 8 is disposed over the base frame 7, the top panel 8 fits on the outside of the left wall 31a, the back wall 31b and the right wall 31c of the base frame 7. A flap 37 is formed in front of the top panel 8 by folding a front end of the top panel 8 over to increase the rigidity of the front end. Reference numbers 38a to 38d refer to screw holes for fastening the screws 34a to 34d.

The top face of the top panel 8 is corrugated and formed into an accordion-pleated pattern except the opening 36 and its margins. Peaks and valleys of the corrugated section 41 extend in a direction "B" orthogonal to the disk loading direction "A" to the vicinity of both side ends of top face where the base frame 7 supports the top panel 8, so that the top panel 8 has high rigidity in the direction "B". The corrugated section 41 is made by press working before or after bending the ends of the top panel 8 downward.

The operation of the disk device 2 will be described. In loading or unloading the disk 4, the tray unit 5 is shifted to the open position. After fitting the chuck hole 4a on the chuck head 23, pressing the front cover 6 backward shifts the tray unit 5 in the disk loading direction "A", and the disk 4 is set at the loaded position. The tray unit 5 is locked inside the case 9. During the rotation of the disk 4, the pickup head 18 writes data on or reads data from the disk 4 with shifting in the radial direction of the disk 4.

The eject button 6a provided on the front cover 6 is pushed to pull out the tray unit 5 to the open position. A press of the eject button 6a unlocks the tray unit 5, and projects the tray unit 5 by approximately 10 mm by biasing force of the eject spring 15. Pulling the front cover 6 with fingers makes the tray unit 5 shift to the open position shown in FIGS. 1 and 2.

The keyboard 3b, incorporated in the notebook PC 3, is disposed higher than the disk device 2, which is incorporated together. Operation on the keyboard 3b applies stress to the top panel 8 from above. However, the top panel 8 has enough rigidity and is not bent.

As shown in FIG. 6, a top panel 50 may have a corrugated section 51 in which a thin metal plate is corrugated into a pattern of a rectangular U-shaped form.

Practical Example

To form the top panel 8, the corrugated section 41 was formed in an aluminum plate with a thickness of 0.25 mm by press working. In the corrugated section 41, the pitch "P" from peak to peak or from valley to valley was set at 2 mm, and the distance "T" from peak (an uppermost point in front face) to valley (a lowermost point in back face) was set at 0.45 mm. In a conventional disk device, a flat aluminum plate with a thickness of 0.45 mm was used as a top panel. The top panel 8 according to this example had approximately the same rigidity as the conventional top panel, in spite of being made of the thinner aluminum plate. Therefore, it was possible to keep rigidity in a conventional level, even with reduction in the thickness of the top panel 8 and weight thereof by approximately 40%.

In the foregoing embodiments, the corrugated section is formed throughout the top face of the top panel from a front end to a back end with leaving small margins. However, since the rigidity of the top panel is low in an area from the front end to the receiving opening, the corrugated section may be narrowed in size as long as being formed in at least this area.

After the corrugated section is formed in the top panel, the corrugated section may be returned into a flat form by press working. In this case, its rigidity is increased by work hardening.

The present invention is also applicable to a slot-in type disk device without a tray, an external disk device and the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device comprising:
   a writing/reading unit for reading data from a loaded disk and/or writing data on said disk;
   a base frame for containing said writing/reading unit;
   a top panel for covering said base frame, an end of said top panel being secured to said base frame; and
   a corrugated section formed in said top panel, including a plurality of peaks and valleys alternately arranged, said peaks and valleys extending in a direction transverse to a loading direction of said disk.

2. The disk device according to claim 1, wherein said corrugated section is formed by press working.

3. The disk device according to claim 1, wherein said peaks and valleys extend to the vicinity of said end.

4. The disk device according to claim 1, wherein said writing/reading unit has a chuck head for holding said disk;
   said top panel has a receiving opening for preventing contact of said chuck head with said top panel; and
   said corrugated section is formed at least in an area from a front end of said top panel to said opening.

* * * * *